United States Patent [19]
Rugar et al.

[11] Patent Number: 5,822,285
[45] Date of Patent: Oct. 13, 1998

[54] ATOMIC FORCE MICROSCOPY DISK DATA STORAGE SYSTEM WITH NONRADIAL TRACKING LINES

[75] Inventors: Daniel Rugar, Los Altos; Bruce David Terris, Sunnyvale, both of Calif.

[73] Assignee: International Business Machines Corporation, Armonk, N.Y.

[21] Appl. No.: 828,473

[22] Filed: Mar. 31, 1997

[51] Int. Cl.[6] .................................................. G11B 7/09
[52] U.S. Cl. .................................. 369/44.26; 369/44.34; 369/275.4
[58] Field of Search ........................... 369/44, 14, 44.26, 369/44.34, 54, 58, 111, 126, 275.3–275.4

[56] References Cited

U.S. PATENT DOCUMENTS

| | | | |
|---|---|---|---|
| 4,948,703 | 8/1990 | Falcone et al. | 430/281 |
| 5,155,715 | 10/1992 | Ueyema et al. | 369/44.11 |
| 5,289,408 | 2/1994 | Mimura et al. | 365/151 |
| 5,321,675 | 6/1994 | Ito et al. | 369/44.26 X |
| 5,345,815 | 9/1994 | Albrecht et al. | 73/105 |
| 5,412,635 | 5/1995 | Maeda | 369/44.26 |
| 5,490,132 | 2/1996 | Yagi et al. | 369/126 |
| 5,526,334 | 6/1996 | Yamano et al. | 369/44.26 X |
| 5,537,372 | 7/1996 | Albrecht et al. | 369/43 |
| 5,646,932 | 7/1997 | Kuribayashi et al. | 369/275.3 |

FOREIGN PATENT DOCUMENTS 0 690 442 A2   1/1996   European Pat. Off. .

OTHER PUBLICATIONS

G. Binnig et al., "Atomic Force Microscope", *Physical Review Letters*, vol. 56, No. 9, Mar. 3, 1986, pp. 930–933.

S. Y. Chou et al., "Imprint Lithography with 25–Nanometer Resolution", *Science*, vol. 272, Apr. 5, 1996, pp. 85–87.

B. W. Chui et al., "Improved Cantilevers for AFM Thermo-mechanical Data Storage", *Proceedings of Solid–State Sensor and Actuator Workshop*, Hilton–Head, SC, Jun. 2–6, 1996, pp. 219–224.

H. J. Mamin et al., "High–density Data Storage Using Proximal probe Techniques", *IBM Journal of Research and Development*, vol. 39, No. 6, Nov. 1995, pp. 681–699.

H. J. Mamin, "Thermal Writing Using a Heated Atomic Force Microscope Tip", *Applied Physics Letters*, vol. 69, No. 3, Jul. 15, 1996, pp. 433–435.

Y. Martin et al., "Atomic Force Microscope–force Mapping and Profiling on a Sub 100–Å Scale", *Journal of Applied Physics*, vol. 61, No. 10, May 15, 1987, pp. 4723–4729.

B. D. Terris et al., "Nonscale Replication for Scanning Probe Data Storage", *Applied Physics Letters*, vol. 69, No. 27, Dec. 30, 1996, pp. 4262–4264.

*Primary Examiner*—W. R. Young
*Attorney, Agent, or Firm*—Thomas R. Berthold

[57] ABSTRACT

A high density data storage system based on atomic force microscopy uses a tracking servo system based on timing or tracking lines placed on the data storage medium. In a disk drive embodiment with a read-only disk, the timing or tracking lines are formed in sets of triplets with the sets being circumferentially spaced around the disk and interspersed with the surface incongruences that form the machine-readable data features. The data tracks and circumferentially-spaced sets of tracking lines are grouped into radially-spaced bands on the disk. Each set of tracking lines includes at least two lines, one of which is a nonradial line. A separate set of identification (ID) marks associated with each data band are used to initiate a timing gate during which the tracking lines are expected to be detected. A comparison of the time between the detection of at least two of the lines with a predetermined target time is used to generate a tracking error signal (TES) that is used to control the actuator and move the stylus back on track or to the desired track.

24 Claims, 7 Drawing Sheets ns that represent machine-readable information or data.
The deflection of the cantilever is detected and decoded to
ATOMIC FORCE MICROSCOPY DISK DATA STORAGE SYSTEM WITH NONRADIAL TRACKING LINES This invention was made with Government support under contract DABT63-95-C-0019 awarded by the Defense Advanced Research Projects Agency of the U.S. Department of Defense. The Government has certain rights in this invention.

TECHNICAL FIELD

This invention relates to atomic force microscope (AFM) systems that employ a cantilever having a probe or stylus at its free end for scanning the surface of a sample. More particularly, the invention relates to an AFM system for data storage wherein the sample being scanned is a data storage medium, such as a disk, that has surface incongruences representing machine-readable information.

BACKGROUND OF THE INVENTION

Atomic force microscopy is based upon the principle of sensing the forces between a sharp probe or stylus and the surface to be investigated. The interatomic forces induce the displacement of the stylus mounted on the free end of a flexible cantilever arm.

As described by Binnig et al., "Atomic Force Microscope", *Phys. Rev. Lett.,* Vol. 56, No. 9, Mar. 3, 1986, pp. 930–933, a sharply-pointed stylus is attached to a spring-like cantilever beam to scan the profile of a surface to be investigated. The attractive or repulsive forces occurring between the atoms at the apex of the stylus and those of the surface result in tiny deflections of the cantilever beam. In its original implementation, a tunneling junction was used to detect the motion of the stylus attached to an electrically-conductive cantilever beam. An electrically-conductive tunnel stylus is disposed within the tunnel distance from the back of the cantilever beam, and the variations of the tunneling current are indicative of the beam deflection. The forces occurring between the stylus and the surface under investigation are determined from the measured beam deflection and the characteristics of the cantilever beam.

In addition to tunneling detection, several other methods of detecting the deflection of the AFM cantilever are available, including optical interferometry, optical beam deflection, capacitive techniques, and more recently piezoresistance. The principle of piezoresistance to detect the deflection of the AFM cantilever is described in U.S. Pat. No. 5,345,815. The cantilever is formed of single-crystal silicon which is implanted with a dopant to provide a piezoresistive region along the length of the cantilever. Deflection of the free end of the cantilever produces stress in the cantilever. That stress changes the electrical resistance of the piezoresistive region in proportion to the cantilever's deflection. A resistance measuring apparatus is coupled to the piezoresistive region to measure its resistance and to generate a signal corresponding to the cantilever's deflection.

AFM systems have applications beyond their original application of imaging the surface of a sample. The principle of atomic force microscopy has been extended to data storage, as described in IBM's U.S. Pat. No. 5,537,372. In that application, the cantilever stylus is in physical contact with the surface of a data storage medium. The medium has surface incongruences in the form of bumps and/or depressions that represent machine-readable information or data. The deflection of the cantilever is detected and decoded to read the data. Data can also be written on the medium, if the medium has a heat-deformable surface, by heating the cantilever stylus when it is in contact with the medium surface to form bumps or depressions on the medium surface. The stylus is heated by a laser beam directed to the stylus region of the cantilever. In another approach for heating the stylus, as described in Chui et al., "Improved Cantilevers for AFM Thermomechanical Data Storage", *Proceedings of Solid-State Sensor and Actuator Workshop,* Hilton Head, S.C., Jun. 2–6, 1996, pp. 219–224, a single-crystal silicon cantilever is selectively doped with boron to provide a conductive path to an electrically-resistive region near the cantilever stylus. The stylus is then resistively heated when current is passed through the conductive path.

It is also possible for the AFM data storage system to operate in the manner similar to that described in the '372 patent, but without the stylus in direct contact with the medium surface. Instead, the stylus engages the surface of the medium and follows the surface topography of incongruences without physically contacting the surface. The stylus is maintained in sufficiently close proximity to the surface of the medium that van der Waals or electrostatic forces are in effect, even though the stylus is not in direct contact with the surface of the medium. The van der Waals forces deflect the stylus toward the medium until the stylus approaches a pit or depression which causes a decrease in or even a complete removal of the van der Waals forces. The stylus sensor follows and detects the surface topography in this manner. This type of AFM data storage system is based on the "attractive mode" of AFM, as described by Martin et al., "Atomic Force Microscope-force Mapping and Profiling on a Sub 100Å Scale", *J. Appl. Phys.,* Vol. 61, No. 10, May 15, 1987, pp. 4723–4729.

One of the problems with AFM data storage systems is the difficulty of maintaining the stylus on the data tracks during reading of data. Unlike conventional magnetic and optical data storage systems, there is no magnetically or optically recorded servo information that can be decoded and used to servo control the positioning of the stylus. In AFM data storage systems, such as that described in the '372 patent, the data density can be 100 times that of a conventional CD-ROM system. The individual data features or marks can be as small as 50 nm and the individual data tracks spaced apart only 100 nm. One type of tracking servo in an AFM data storage system is based on contiguous "wobble" marks placed on opposite sides of the data track centerline in a manner analogous to sector servo marks in magnetic recording, as described by Mamin et al., "High-density Data Storage Using Proximal Probe Techniques", *IBM J. Res. Develop.,* Vol. 39, No. 6, November 1995, pp. 687–688. However, the wobble marks are difficult to detect and fabricate with sufficient accuracy, and it is difficult to achieve a tracking error signal which varies linearly with off-track distance.

What is needed is an AFM data storage system with a tracking servo control system that can maintain the stylus on track at these extremely small dimensions.

SUMMARY OF THE INVENTION

The invention is an AFM data storage system with a tracking servo system based on timing or tracking lines placed on the data storage medium. In a disk drive embodiment with a read-only disk, the timing or tracking lines are formed in sets of triplets with the sets being circumferentially spaced around the disk and interspersed with the surface incongruences that form the machine-readable data features. The data tracks and circumferentially-spaced sets of tracking lines are grouped into radially-spaced bands on the disk. Each set of tracking lines includes at least two lines, one of which is a nonradial line that thus intersects the data tracks at an angle other than perpendicular. A separate set of identification (ID) marks associated with each data band are used to initiate a timing gate during which the tracking lines are expected to be detected. A comparison of the time between the detection of at least two of the lines with a predetermined target time is used to generate a tracking error signal (TES) that is used to control the actuator and move the stylus back on track or to the desired track. In one embodiment, there are three lines in a set with the middle line being a nonradial line and the two outer lines being radial lines. Counters in the timing analysis circuit count the time from detection of the first radial line to the middle nonradial line and to the second radial line. The ratio of the two times is used to generate the TES, which is thus independent of disk velocity, so that slight variations in disk rotational speed do not cause errors in the tracking servo system.

For a fuller understanding of the nature and advantages of the invention, reference should be made to the following detailed description taken together with the accompanying drawings.

DESCRIPTION OF THE PREFERRED EMBODIMENTS

Figure 1:
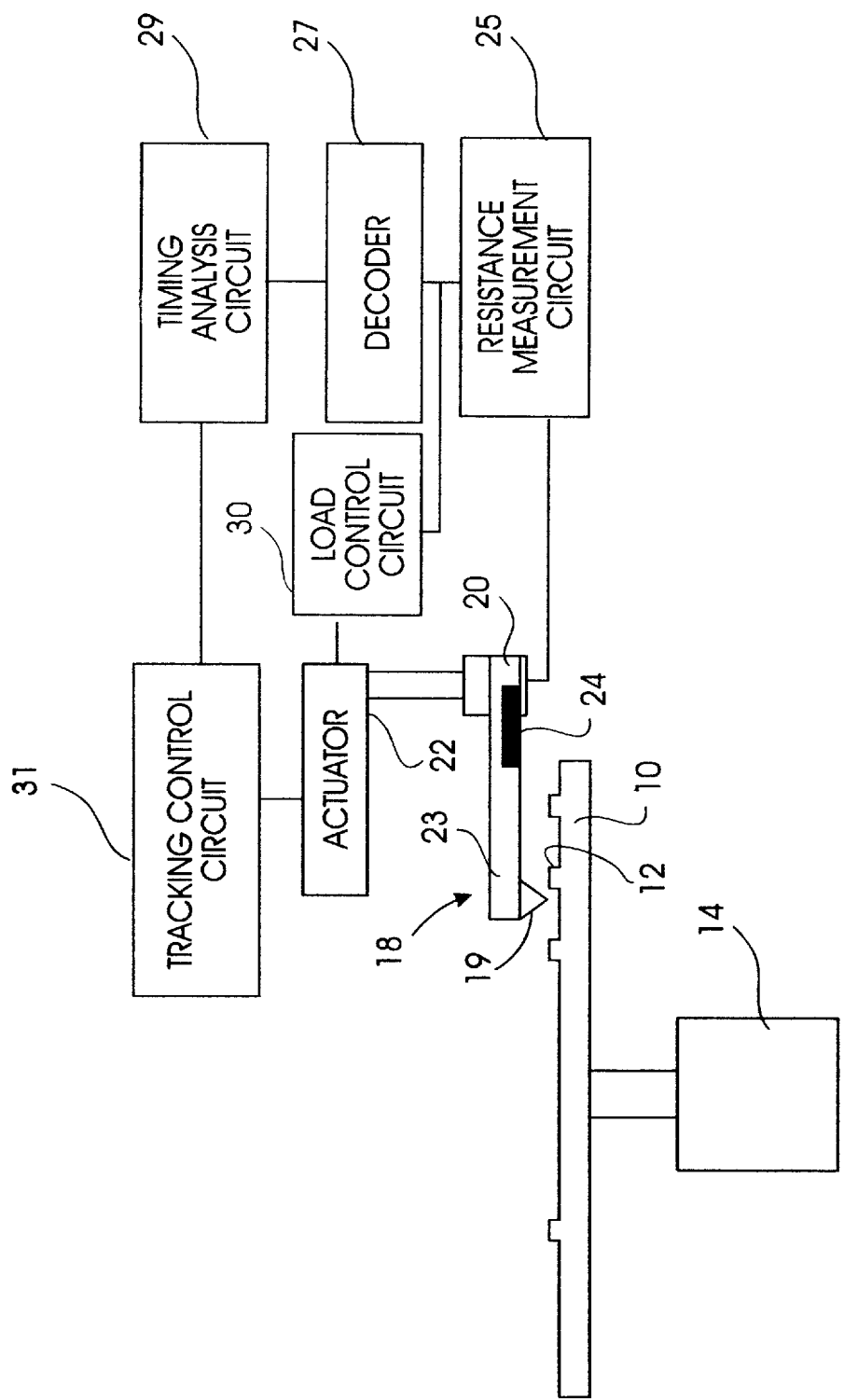
FIG. 1 is a block diagram of the AFM data storage system of the present invention.

Referring to FIG. 1, the AFM data storage system is shown schematically as a disk drive with a rotatable data storage disk. While the invention will be described in terms of the preferred embodiment of a disk drive, the system may also function with a flat substrate as the storage medium that is moved in an X–Y raster. In that embodiment, the data tracks are arranged as essentially parallel lines that are oriented parallel to either the X or Y direction, whichever is the faster scan direction. The storage medium may either be removable from the system, or permanently sealed within it.

In FIG. 1, the storage medium is preferably a circular disk 10 and may be formed in a number of ways. The disk 10 is preferably made from a polymer material, such as polymethyl methacrylate (PMMA), polycarbonate, or an acrylate-based, photo-curable polymer, as described in U.S. Pat. No. 4,948,703. The disk 10 is embossed on the upper face with machine-readable information, shown as surface incongruences 12. The phrase "machine-readable information" means information that is readable by a digital processing resource such as a programmed computer or microprocessor. More specifically, a plurality of data tracks are provided having a series of surface incongruences arranged in a machine-readable pattern of data marks or features. The embossed incongruences may be a series of pits or indentations separated by island portions of the disk 10 that are not pitted. Alternatively, instead of pits, a series of raised protuberances or bumps could be provided, as shown by bumps 12. The data tracks are radially spaced on the disk and may be formed as either discrete concentric tracks, as in conventional digital magnetic recording disk drives, or spiral tracks, as in compact disc (CD) optical recording. Alternatively, the storage medium need not be circular and need not be moved in a rotary manner.

The disk 10 is positioned above a motor spindle 14. The disk 10 is supported on the motor spindle and rotated at a uniform speed by the motor 14. The disk 10 is positioned so that the center of the disk is located approximately at the center of rotation of the spindle motor. A high resolution contact sensor 18 with stylus 19 mounted on a support 20 is positioned above the disk. The support 20 is connected to an actuator 22. The actuator 22 is an electromagnetically-driven, voice coil-type actuator, as is found in an optical disk or CD player. The actuator 22 is movable both along an axis perpendicular to the disk surface for controlling the load of the stylus 19 on the disk 10, and in the plane parallel to the disk 10. The motion in the plane parallel to the disk is at least partially in the radial direction from the center of rotation of the disk and allows the stylus to be positioned to different data tracks.

The contact sensor includes a microfabricated cantilever arm 23 extending at one end from a base attached to support 20. The cantilever arm 23 is fabricated with a piezoresistive region 24 that is electrically conducting, with its resistance changing as the arm is bent. Such a device can be fabricated from doped silicon as described in U.S. Pat. No. 5,345,815. A sharp stylus 19 is located at the free end of the cantilever arm 23. The stylus 19 is positioned to engage the surface of the storage disk 10. The stylus is downwardly biased so that it tracks the surface topography of the disk. When the disk 10 is rotated, the cantilever arm 23 rises and falls as the stylus 19 tracks over the incongruences 12 on the surface of the storage disk.

Figure 2:
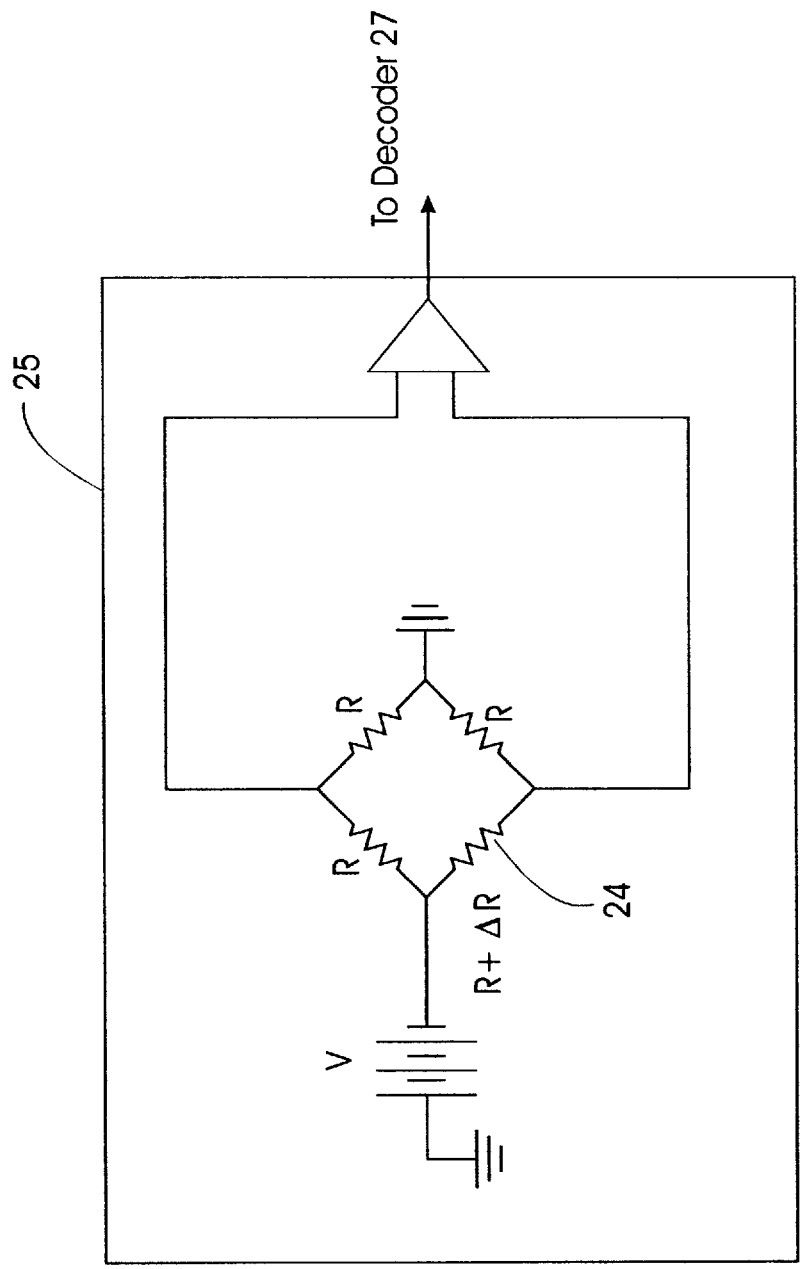
FIG. 2 is a schematic of the resistance measurement circuit used to detect cantilever deflections in the AFM data storage system.

A resistance measurement circuit 25 is connected to the cantilever arm 23 by means of conducting wires. As the stylus 19 tracks the incongruences of the storage disk 10, the resistance of piezoresistive region 24 on cantilever arm 23 changes. This change is continuously monitored and measured by means of the resistance measurement circuit 25. The resistance measurement circuit 25 has a drive voltage (V) and a resistance bridge suitable for measuring small changes in resistance ($\Delta R$), as shown in FIG. 2. Each of the three fixed resistors R in the bridge has a resistance approximately equal to the resistance on the cantilever arm 23 when it is not bent. The measured output voltage $\Delta V$ due to the change in resistance $\Delta R$ of the cantilever arm when it is bent is approximately:

$$(V/4)*(\Delta R/R).$$

The typical fractional change in lever resistance, $\Delta R/R$, is of the order $10^{-7}$ to $10^{-5}$ per Angstrom of deflection. For incongruences 50 nm high and a driving voltage of 2 volts, this produces an output voltage $\Delta V$ of approximately 0.1–10 mV. This analog voltage change from resistance measurement circuit 25 is amplified and then converted into a digital signal by a decoder 27. Such decoding can be done either by means of conventional peak detection or threshold detection, depending on the method of data encoding used.

The system of FIG. 1 can be operated in a "constant force" mode, a "constant height" mode, or a combination thereof. In a constant force mode, the movement of the actuator 22 perpendicular to the disk is controlled by the load control circuit 30 which uses information obtained from the piezoresistive region 24 in cantilever arm 23, via the resistance measurement circuit 25 as to the features on the disk surface. The signal sent to the actuator 22 from the load control circuit 30 can be used to maintain constant cantilever deflection, and thus a constant loading force on the stylus 19. In constant height mode, the actuator 22 does not move the cantilever arm 23 perpendicular to the disk surface so the cantilever deflects varying amounts as the surface incongruences pass under it. In combination mode, the load control circuit 30 and actuator 22 are used to maintain a generally constant loading force on a long time scale, taking out variations due to long-term drift, for example, or large features on the surface of the disk. The cantilever arm 23 is left free to deflect, however, as the stylus 19 encounters the small surface incongruences. In a data storage application, the combination mode is the preferred embodiment. In each case, however, the signal from the resistance measurement circuit 25 is used as the input to the decoder 27, which converts it to binary form, i.e., machine-readable information, in a manner well known in the art.

While the use of a silicon cantilever 23 with a doped piezoresistive region 24 and the resistance measurement circuit 25 is the preferred method of detecting the cantilever deflection, the cantilever deflection can also be detected by other known techniques, such as the reflected laser light method described in the '372 patent. Regardless of the cantilever deflection detection technique used, the output is decoded into digital data by decoder 27.

Figure 3:
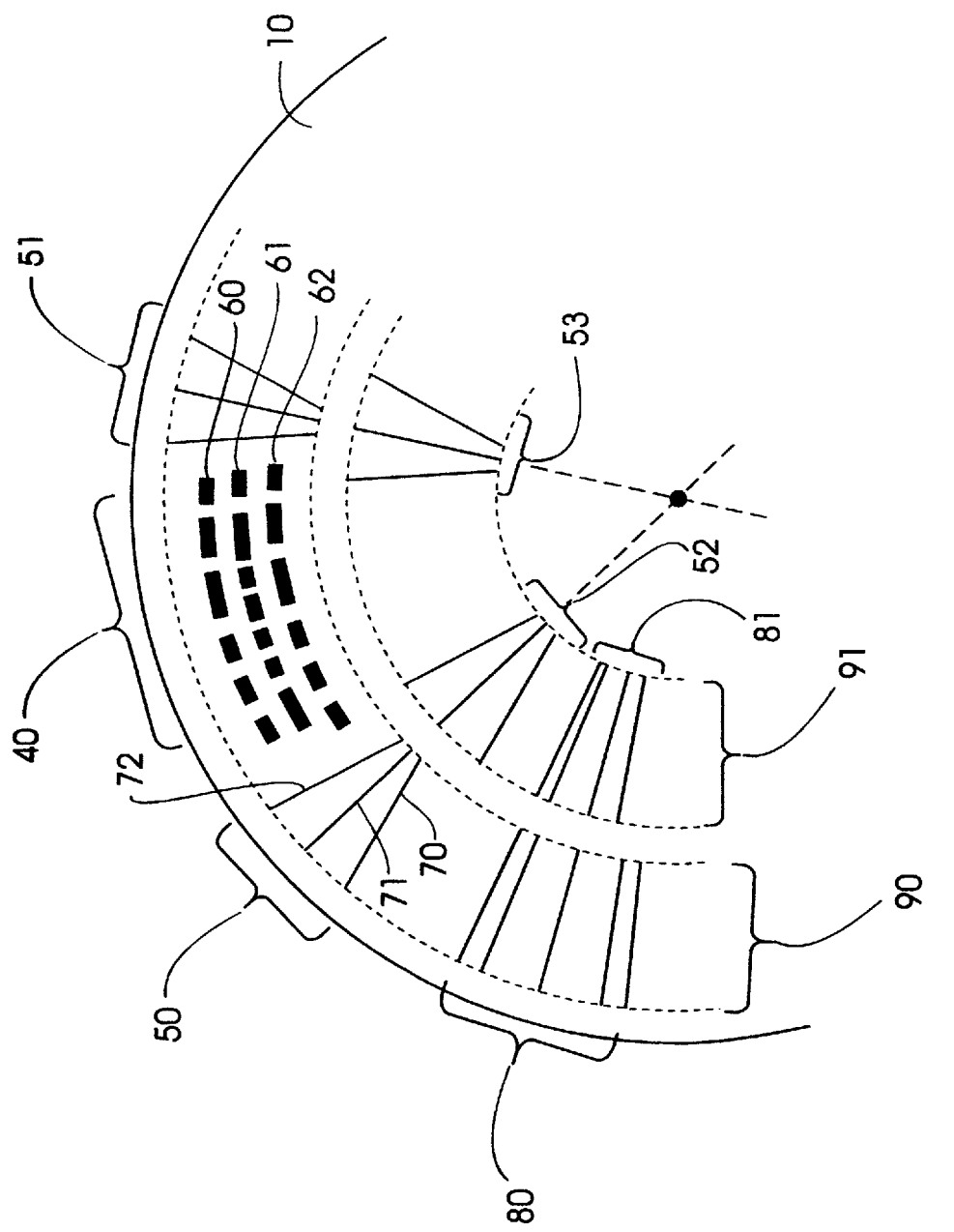
FIG. 3 is a representation of a portion of the disk surface illustrating the surface incongruences used for data features and tracking lines for tracking servo control.

Referring now to FIG. 3 which is a section of disk 10, the storage disk has several shapes of incongruences or marks embossed on it, each serving a different purpose. First, the data marks or features 40 comprise narrow, variable length pits and islands forming a pulse width modulation encoding scheme. Alternatively, the data features could be varied in depth, thus forming an amplitude modulation scheme. The smallest of the data features 40 are approximately 50 nm wide and are arranged in tracks which are circular in shape and centered about the center of the storage disk 10. The data features 40 are shown as sections of three radially adjacent and radially-spaced data tracks 60–62. Data tracks 60–62 are located in a radial band 90 of data tracks. A second band 91 of data tracks is depicted radially inwardly of band 90.

In the preferred embodiment, the disk is a read-only disk. The data features and other marks are written on a master disk and then embossed into the storage disk. The marks are formed on the master disk by electron beam writing on PMMA resist-covered silicon oxide, as described by Terris et al., "Nanoscale Replication for Scanning Probe Data Storage", *Appl. Phys. Lett.,* Vol. 69, No. 27, Dec. 30, 1996, pp. 4262–4264. After exposing the resist using an electron beam, the written data pattern is transferred to the silicon oxide by appropriate developing of the resist and etching. Alternatively, a master can be made using an AFM tip to create marks in a polymer master, which is also described in the Terris et al. paper.

The pattern of surface incongruences is then embossed into the storage disk by molding, as described in U.S. Pat. No. 4,948,703. A thin film of a photocurable polymer film is formed on the surface of the master. Prior to forming this film, the master is coated with a release agent, such as amorphous TbFeCo. A glass substrate, which forms a base for the storage disk, is pressed against the thin polymer film. The film is exposed to ultraviolet light to cure it, thus forming a hardened polymer film. The master and disk support are separated, leaving the hardened polymer attached to the glass support. Alternatively, marks can also be formed by injection molding orby pressing the master into a heated PMMA film, as described by Chou et al., "Imprint Lithography with 25-Nanometer Resolution", *Science,* Vol. 272, Apr. 5, 1996, pp. 85–87. The data marks represent a series of 1's and 0's and thus represent stored data. Such marks can alternatively be written onto the storage disk directly by the stylus to form a write-once type of data storage medium, as described by Mamin, "Thermal Writing Using a Heated Atomic Force Microscope Tip", *Appl. Phys. Lett.,* Vol. 69, No. 3, Jul. 15, 1996, pp. 433–435.

Referring again to FIG. 3, a second shape of incongruences, the timing lines or tracking lines, are indicated as tracking line sets 50, 51, 52, 53. These are narrow lines, approximately 50 nm high (or deep) and 100 nm wide, and are electron beam written on the master and embossed into the storage disk as described above. To maintain the stylus 19 on a given data track, several of which are shown schematically in FIG. 3 as tracks 60, 61, 62, the time interval between successive tracking lines is measured. The lines are grouped in sets of three lines per set, forming a triplet. The middle line of each triplet, such as line 71 in set 50, is aligned substantially along a radius of the disk 10. The other two lines (70, 72 in set 50) each form an angle of 22.5 degrees to the middle line 71 and are positioned so that the lines do not intersect. These two lines 70, 72 are thus nonparallel and nonradial lines. The triplet sets 50, 51 are uniformly spaced one from another along the track direction and are written around the entire circumference of the disk, thus forming a band of triplets. The triplets are spaced and are of a radial length such that lines from one triplet do not intersect lines from adjacent triplets. The radial length of the band, the number of triplets around the circumference, and the angle between the lines within a triplet may be different at different disk radii. It is preferable to have many data tracks within one band. In the preferred embodiment, at a band diameter of 5 mm and a band radial length of 30 microns, there are 300 tracks placed on a 0.1 micron track pitch. There can be up to 1000 triplets in such a band, although fewer could be written so as to increase the area available for data features. Bands of triplets are written so that one band begins where the previous band ended, thus covering the entire data-containing area of the storage disk. Placed between the triplets are the data features, as shown by data features 40 in tracks 60–62 located between adjacent triplet sets 50, 51, for example.

In addition, while the preferred set of lines is a triplet, the invention is fully applicable if there are only two lines, provided they are nonparallel and at least one of them is a nonradial line. In the triplet of lines 70, 71, 72, the middle line 71 is used for robustness. The middle line provides a check to determine that three lines have been detected within the timing gate and that the first line 70 and third line 72 are equally spaced from the middle line 71. Thus, it is possible for the set of lines to consist of only lines 70 and 72.

Within each band, along with the sets of tracking lines and data marks, band identification (ID) marks 80 are also written by electron beam and embossed onto the disk. These ID marks, when decoded, are used to determine which band of triplets the stylus 23 is reading. In addition, the ID marks are recognized by the decoder 27 to signify the position of a triplet. Since the spacing between triplets is known, the position of all triplets around the circumference can thus be determined. This information is used to generate a timing gate signal for use in the timing analysis, as will be explained below. In addition to the read-only disk described in the preferred embodiment, the tracking servo system described here can also be used in a write-once disk drive. In this embodiment, the timing lines are embossed into the storage medium as described, but the data features are not. The data features in the tracks are written onto the disk directly by the stylus, as described by Mamin, "Thermal Writing Using a Heated Atomic Force Microscope Tip", *Appl. Phys. Lett.,* Vol. 69, No. 3, Jul. 15, 1996, pp. 433–435.

Figure 4:
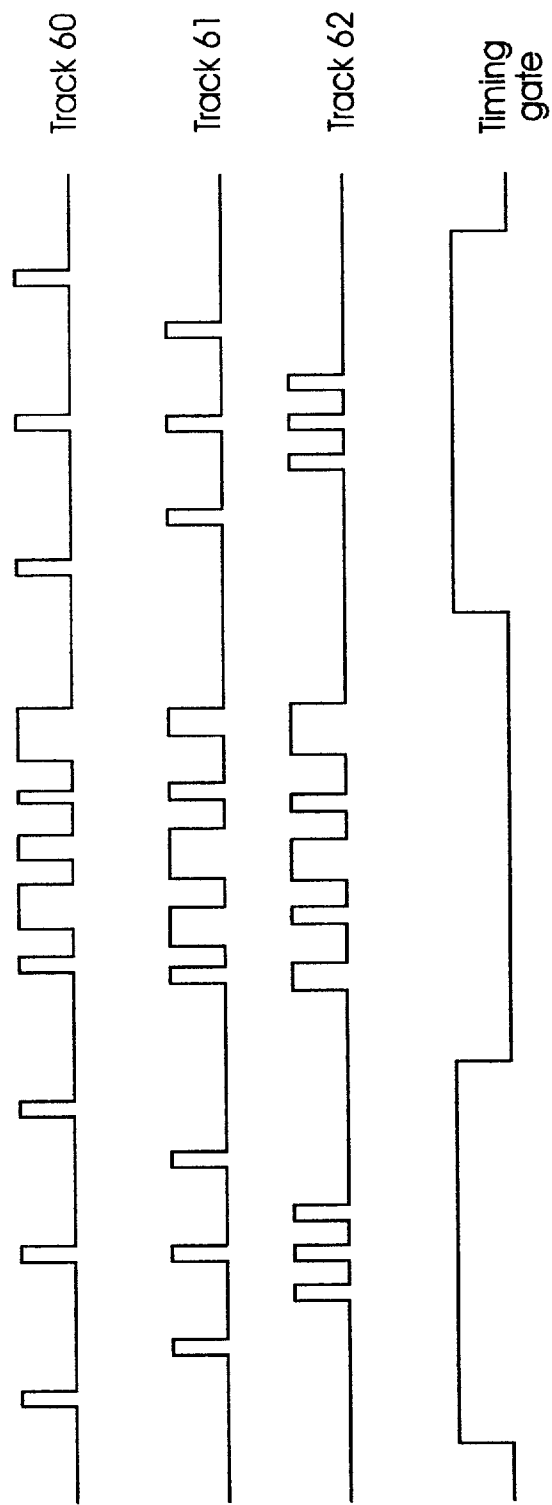
FIG. 4 is a graph of decoder output for three different data tracks illustrating the timing of the tracking lines relative to a timing gate.

FIG. 4 shows a schematic of the output of decoder 27 at three different data tracks 60, 61 and 62 within band 90. Track 60 is located radially outward of track 61, which in turn is located radially outward of track 62. If track 61 is the desired track, then the spacing of the lines (70, 71, 72) along the track direction within one triplet (50) is larger on track 60 than on track 61. Similarly, the line spacing is smaller on track 62 than on tracks 61 or 60. Thus, the time interval between the two nonparallel, nonradial lines within a triplet (e.g., lines 70, 72 in triplet 50) determines whether the stylus 19 is on track and is used to maintain the stylus 19 on track. The bottom portion of FIG. 4 shows the timing gate signal, which is high during the time windows when the tracking lines are expected to be detected.

Figure 5:
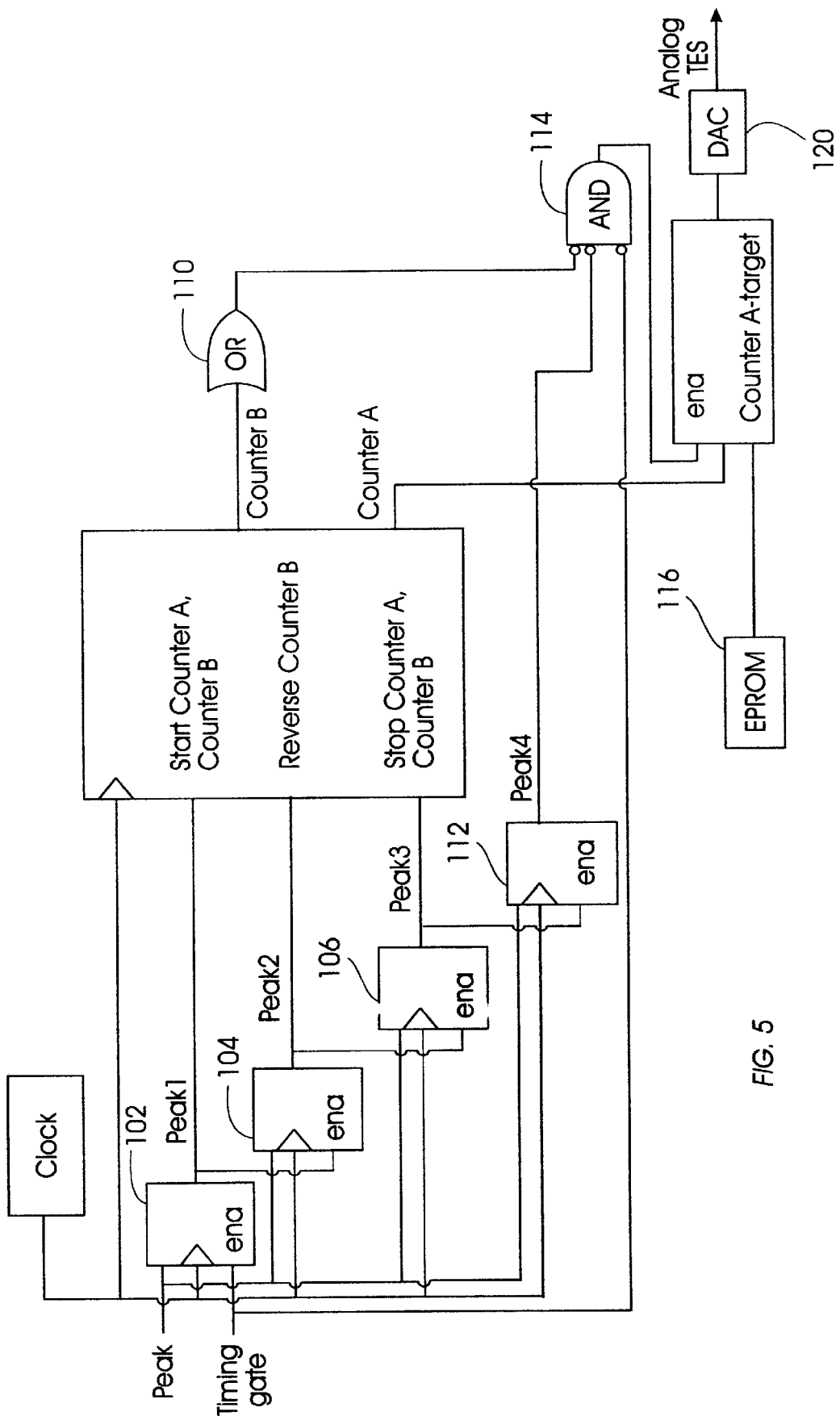
FIG. 5 is a block diagram of the timing analysis circuit for generating a tracking error signal (TES).

FIG. 5 is a schematic of the timing logic used to determine whether the stylus is on track. After detecting the band ID marks 80, the decoder 27 generates a timing gate signal, which is high for the expected duration of a triplet, at the expected time intervals between triplets. The timing gate and decoder signals are input into the timing analyzer circuit 29 (FIG. 1). The first peak (peak 1) detected after the timing gate goes high causes two counters, A and B, to start incrementing. This peak is caused by line 70 in triplet 50 and is detected using a latch 102, which is enabled by the timing gate signal and transfers the enable signal level to the latch output each time a peak is received. The latch 102 output is labeled as peak 1 in FIG. 5. The counters A and B tally the number of clock cycles elapsing before being stopped. The counters can either count up, where for each additional clock cycle the stored total is incremented by 1, or down, where for each additional clock cycle the stored total is decremented by 1. The clock is generated by the timing analysis circuit using standard electronic techniques, for example, by a crystal oscillator. At the second peak (peak 2) corresponding to line 71 in triplet 50, detected using a latch 104 having peak 1 as the enable signal, counter B is reversed while counter A continues to accumulate. At the third peak (peak 3) corresponding to line 72 in triplet 50, detected using a latch 106 having peak 2 as the enable signal, both counters A and B are halted and the values stored. The counters need to have a sufficient number of bits to store the expected number of clock cycles. In the preferred embodiment, this is at least 12 bits.

After the counters have stopped, the content of counter B is examined. Ideally, if the three tracking lines 70–72 within the triplet are evenly spaced, this will be 0. A simple method of determining if this is the case is to feed the counter B bit lines to a 12bit OR gate 110. If all 12 bits are 0, then the output of OR gate 110 will be 0. Since small errors in the tracking line placement or clock variations can produce slight differences in the measured time between the lines, it is desirable to allow for counter B to be slightly different from 0. This is achieved by comparing only the 10 or 11 most significant bits of counter B in the OR gate 110. The output of OR gate 110 is used to confirm that counter A contains valid track timing information.

Before generating a tracking error signal (TES), a second validity check is made. While the timing gate from the decoder 27 is high, only three signals should be received (FIG. 4). A latch 112, having peak 3 as the enable signal, is used to look for a fourth peak (peak 4). If none is received, then the peak 4 signal level will be low when the timing gate returns to a low level. Thus, a valid timing measurement will have been made if both the OR gate 110 level and peak 4 level are low when the timing gate returns low. The satisfying of these three conditions is determined using AND gate 114 with inverted inputs. A high output of AND gate 114 signifies a valid timing measurement.

This AND gate 114 output is the enable signal for updating the TES. Counter A, which is the elapsed time between the first and third peaks (corresponding to lines 70 and 72 in triplet 50), is compared to a target value. This target value is retrieved from a lookup table, such as an EPROM 116. Each data track radial position has a target value stored in EPROM 116. The difference between the target value and counter A is a digital TES and is converted to an analog TES by DAC 120 and input to the tracking control circuit 31 (FIG. 1). Using standard control electronics, the tracking control circuit 31 drives the actuator 22 to move the stylus 19 toward the desired track. If the AND gate 114 remains low, then the TES is not updated. After the timing gate goes low, the timing analysis circuit 29 is reset and waits for the next high timing gate signal indicating the next triplet. Alternatively, the tracking control circuit 31 can be implemented as a totally digital controller, without the need for DAC 120.

Figure 6:
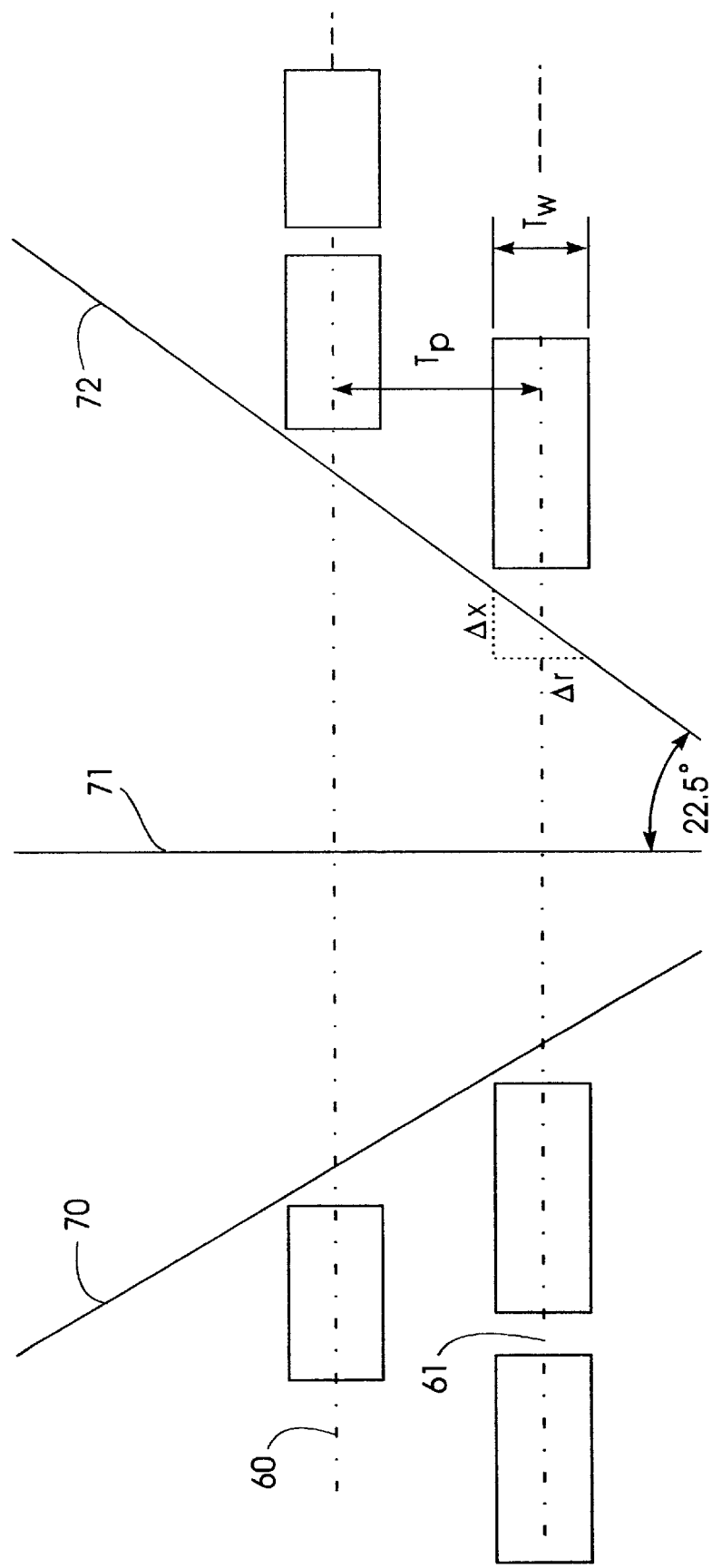
FIG. 6 is an enlarged view of a portion of the disk surface illustrating a triplet of tracking lines and their spacing relative to two adjacent data tracks.

To achieve sufficient accuracy in tracking, the clock frequency f must be such that counter A can both resolve where the centerline of the track is and differentiate between two adjacent tracks. In the preferred embodiment, the radial width of the bits (marks 40 in FIG. 3) is 50 nm and thus the radial width of the track $T_w$, which is the distance over which the stylus deflection is the full amplitude, is also 50 nm. Once the stylus is more than $T_w/2$ from the track centerline, the stylus deflection and thus detected $\Delta R$ will rapidly decrease. In the preferred embodiment, the difference between counter A readings for the stylus moving a radial distance of $T_w$ is at least 5 counts. FIG. 6 shows a triplet of tracking lines 70, 71, 72 between two bit patterns on two adjacent tracks 60, 61. The tracks are separated by a track pitch $T_p$. The difference in counter A values across the bit width $T_w$ arises from a difference in distance the stylus has traveled of $2\Delta x$. From geometry, this is related to the difference in radial distance of:

$$\Delta r = 2\Delta x / \tan(22.5).$$

For $T_w$ of 50 nm, the path difference $2\Delta x$ is:

$$50/\tan(22.5) = 120 \text{ nm}.$$

The time difference measured by counter A is then 120 f/v, where v is the linear velocity of the disk at the track diameter and f is the clock frequency in cycles. For example, for a linear velocity of 0.1 m/s and counter A difference of 5 counts across the bits of width 50 nm, then:

$$f = 5v/120 = (5*0.1)/(120*10^{-9}) = 4.2 \text{ MHZ}.$$

To distinguish one track from the next, the track pitch $T_p$ must be greater than $T_w$. In addition, the clock frequency f must be sufficiently high enough to allow counter A to resolve the tracks, i.e., there must be some spacing in counter A counts between tracks. Using the 4.2 MHZ clock as above, a $T_p$ of 100 nm would allow 5 counts of counter A between tracks. If the clock frequency were increased, the track pitch could be reduced and the ability to stay on the centerline of a given track would be improved.

Figure 7:
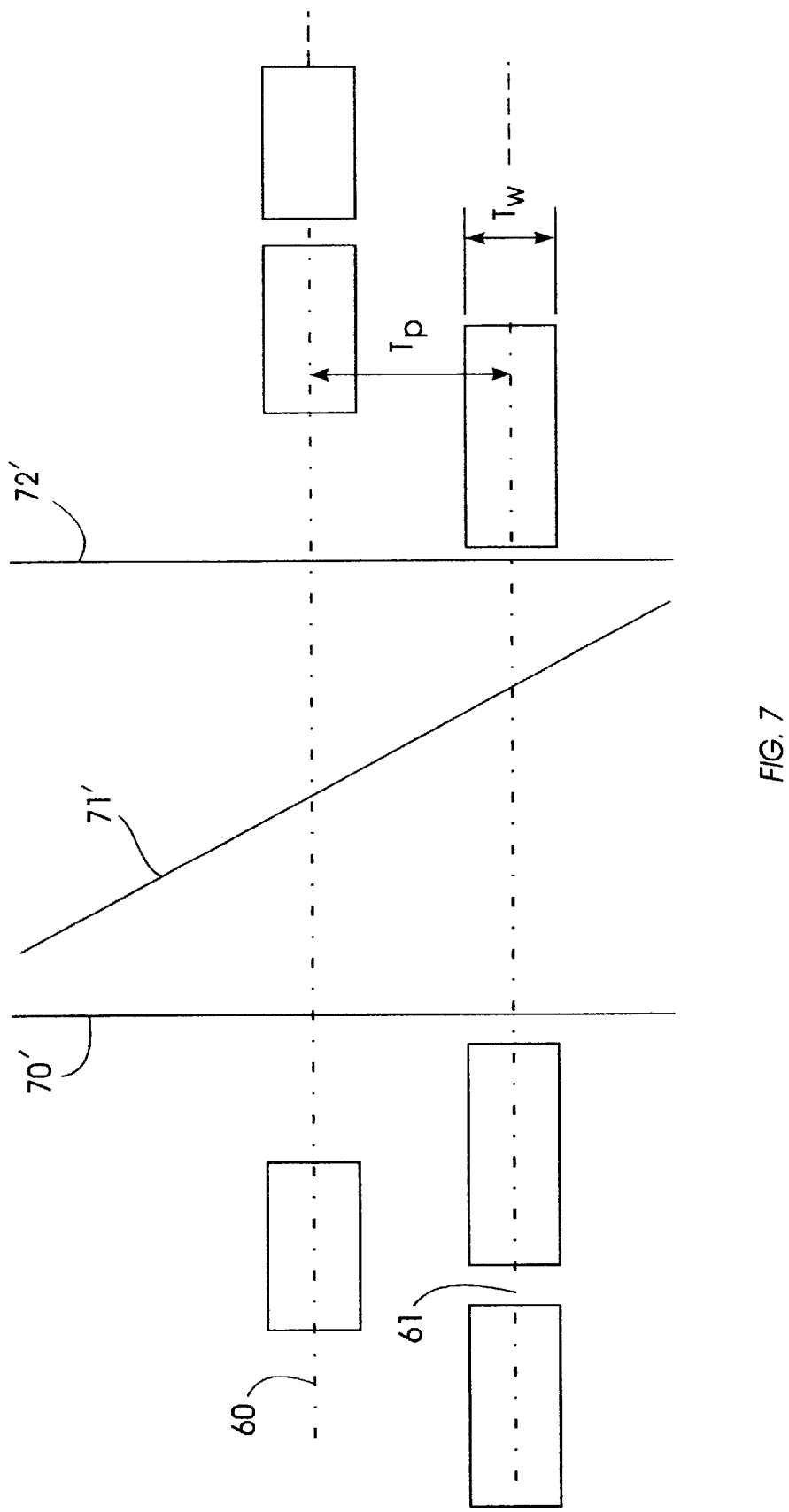
FIG. 7 is an enlarged view of a portion of the disk surface illustrating an alternative triplet of tracking lines and their spacing relative to two adjacent data tracks.

Referring to FIG. 7, an alternative set of timing lines is depicted. The outer two lines 70', 72' are aligned substantially along radii of the disk. The middle line 71' is a nonradial line placed so that it does not intersect either of the outer lines and extends the full length of the outer lines. In this embodiment, counters A and B start accumulating after detecting the first peak, counter A is stopped after detecting the second peak, and counter B is stopped after detecting the third peak. The TES is the ratio of counter A to counter B. As can be seen in FIG. 7, this ratio decreases as the stylus moves from the outer diameter of the band toward the inner diameter. This ratio is precisely 1/2 when the stylus is precisely at the middle of the band. In this embodiment, because the TES is the ratio of two times measured from the same timing line, the TES is independent of the disk velocity. In each of the different sets of timing lines, as shown FIG. 6 and FIG. 7, there is at least two timing lines, at least one of which is a nonradial line that crosses the directions of the data tracks at an angle other than perpendicular.

While the preferred embodiments of the present invention have been illustrated in detail, it should be apparent that modifications and improvements may be made to the invention without departing from the spirit and scope of the invention as described in the following claims.

What is claimed is:

1. A data storage system comprising:
   a data storage medium having formed thereon a surface topography defining machine-readable information formed in a plurality of spaced-apart tracks, the medium surface topography including a plurality of sets of lines extending across the tracks, each set of lines including at least two lines, at least one of which extends across the tracks at an angle other than perpendicular to the direction of the tracks;
   a sensor for engaging the storage medium and deflecting back and forth to follow the surface topography when the storage medium is moved relative to the sensor;
   means for providing relative motion between the storage medium and the sensor;
   an actuator connected to the sensor for maintaining the sensor on a track and for moving the sensor from one track to another track;
   a detector for detecting deflections of the sensor caused by the surface topography, including the sets of lines, and for generating an output signal representative of the deflections of the sensor;
   a timing circuit for determining from the output signal from the deflection detector the time between the detection of lines in a set, the timing circuit including circuitry for comparing the determined time to a target time and for generating a tracking error signal representative of the difference between the determined time and the target time;
   a tracking controller circuit coupled to the actuator and responsive to the tracking error signal for positioning the sensor on a desired track; and
   a data decoding circuit for receiving the output signal from the deflection detector and for converting the output signal to digital data signals representative of the machine-readable information formed by the surface topography on the medium.

2. The data storage system according to claim 1 wherein the medium is a disk, wherein the tracks are generally radially-spaced tracks, and wherein the sets of lines are spaced circumferentially around the tracks.

3. The data storage system according to claim 2 wherein the tracks are discrete generally concentric tracks.

4. The data storage system according to claim 2 wherein the tracks are generally spiral tracks.

5. The data storage system according to claim 2 wherein the means for providing relative motion is a spindle motor attached to the disk, and wherein the disk is removable from the spindle motor.

6. The data storage system according to claim 2 wherein each set of lines consists of three circumferentially adjacent lines, the middle line of the three being located on a radius of the disk.

7. The data storage system according to claim 2 wherein each set of lines consists of three circumferentially adjacent lines, the middle line of the three being a nonradial line and the other two lines being radial lines.

8. The data storage system according to claim 2 wherein the tracks are grouped into radially-spaced bands, and wherein each band of tracks includes its own plurality of sets of lines.

9. The data storage system according to claim 8 wherein the surface topography on the disk includes band identification (ID) marks, and wherein the timing circuit includes circuitry for decoding the ID marks to identify the band in which the sets of lines are located.

10. The data storage system according to claim 9 wherein the timing circuitry includes a timing gate responsive to the decoded ID marks for locating a timing window during which the sets of lines are expected to be detected.

11. The data storage system according to claim 1 wherein the timing circuit includes a clock and a counter for counting the number of clock cycles between the detection of two of the lines in a set.

12. The data storage system according to claim 1 wherein the sensor is a contact sensor that physically contacts the surface of the data storage medium.

13. A data storage system comprising:
   a data storage disk having on its surface at least one band of radially-spaced data tracks of surface incongruences representing machine-readable information and a plurality of sets of tracking lines circumferentially spaced around the data tracks, each set of tracking lines comprising at least two lines, at least one of which is a nonradial line;
   a motor for rotating the disk;
   a flexible cantilever having a contact stylus on its free end for engaging and contacting the surface incongruences and tracking lines on the disk during rotation of the disk;
   an actuator connected to the cantilever for maintaining the stylus on a data track and for moving the stylus from one data track to another data track;
   a cantilever deflection detector for detecting deflections of the stylus caused by the surface incongruences and tracking lines on the disk and for generating an output signal representative of the deflections of the stylus;
   a timing circuit for determining from the output signal from the deflection detector the time between the detection of tracking lines in a set, the timing circuit including circuitry for comparing the determined time to a target time and for generating a tracking error signal representative of the difference between the determined time and the target time;

a tracking controller circuit coupled to the actuator and responsive to the tracking error signal for positioning the stylus on a desired data track; and a data decoding circuit for receiving the output signal from the deflection detector and for converting the output signal to digital data signals representative of the machine-readable information formed by the surface incongruences on the disk.

14. The data storage system according to claim 13 wherein the data tracks are discrete generally concentric data tracks.

15. The data storage system according to claim 13 wherein the data tracks are generally spiral data tracks.

16. The data storage system according to claim 13 wherein the disk is removable from the motor.

17. The data storage system according to claim 13 wherein each set of lines consists of three circumferentially adjacent lines, the middle line of the three being located on a radius of the disk and the other two lines being nonradial lines that are nonparallel to each other.

18. The data storage system according to claim 13 wherein each set of lines consists of three circumferentially adjacent lines, the middle line of the three being a nonradial line and the other two lines being radial lines.

19. The data storage system according to claim 13 wherein the disk also has on its surface band identification (ID) marks, and wherein the timing circuit includes circuitry for decoding the ID marks to identify the band in which the sets of lines are located.

20. The data storage system according to claim 19 wherein the timing circuitry includes a timing gate responsive to the decoded ID marks for locating a timing window during which the sets of lines are expected to be detected.

21. The data storage system according to claim 13 wherein the timing circuit includes a clock and a counter for counting the number of clock cycles between the detection of two of the lines in a set.

22. The data storage system according to claim 13 wherein the cantilever is a silicon cantilever containing a piezoresistive region, and wherein the cantilever deflection detector comprises electrical resistance detection circuitry coupled to the piezoresistive region of the cantilever for detecting changes in resistance of the piezoresistive region in response to deflection of the stylus.

23. A data storage disk comprising a disk substrate having a surface formed of a polymer material, the disk surface having embossed on it as surface incongruences at least one band of radially-spaced data tracks representing machine-readable information and a plurality of sets of continuous tracking lines circumferentially spaced around the data tracks, each set of tracking lines comprising at least two continuous lines that extend across all the tracks in the band and the regions between the tracks, at least one of the two continuous lines being a nonradial line.

24. A read-only data storage disk comprising a disk substrate having a surface formed of a polymer material, the disk surface having embossed on it at least one band of radially-spaced data tracks of surface incongruences representing machine-readable information and a plurality of sets of continuous tracking lines circumferentially spaced around the data tracks, each set of tracking lines comprising at least two nonparallel continuous lines that extend across all the tracks in the band and the regions between the tracks, at least one of the continuous lines being a nonradial line.

* * * * *